(12) United States Patent
Chew

(10) Patent No.: US 6,984,793 B1
(45) Date of Patent: Jan. 10, 2006

(54) MULTIDIRECTIONAL SWITCH ACTUATOR AND A PERSONAL DIGITAL ASSISTANT USING THE SAME

(75) Inventor: Kwan Wee Anthony Chew, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/900,625

(22) Filed: Jul. 27, 2004

(51) Int. Cl.
*H01H 9/00* (2006.01)

(52) U.S. Cl. .......................... 200/4; 200/332; 200/343; 200/17 R; 400/490; 400/491.2

(58) Field of Classification Search ............... 200/4, 200/5 R, 6 R, 17 R, 520, 341, 343, 332, 200/344, 332.1; 400/490–491.2, 496
See application file for complete search history.

(56) References Cited

U.S. PATENT DOCUMENTS

| | | | | |
|---|---|---|---|---|
| 4,172,217 A | * | 10/1979 | Miller | 200/86.5 |
| 4,613,736 A | * | 9/1986 | Shichijo et al. | 200/317 |
| 4,877,925 A | * | 10/1989 | Kobayashi | 200/5 A |
| 5,003,133 A | * | 3/1991 | Kobayashi et al. | 200/5 A |
| 5,131,308 A | * | 7/1992 | Katsuta | 84/434 |
| 5,523,531 A | * | 6/1996 | Ozaki | 200/5 R |
| 5,664,668 A | * | 9/1997 | Zainal et al. | 200/332 |
| 6,147,314 A | * | 11/2000 | Han et al. | 200/5 A |
| 6,570,111 B2 | * | 5/2003 | Nakagawa et al. | 200/343 |

* cited by examiner

*Primary Examiner*—Richard K. Lee

(57) ABSTRACT

An actuator suitable for multi-directional actuation of a push button switch is disclosed. This actuator has an actuation button attached to a plunger to define a predetermined angle therebetween. The actuation button has a surface for multi-directional activation. The actuator also has a pair of hinge pins that is attached to the actuation button for pivotably mounting the actuator about a pivoting axis. Activation on any point on the surface of the actuation button results in a unidirectional moment about the pivoting axis to tilt the plunger to releasably actuate the push button switch. Also disclosed is a personal digital assistant that uses the actuator for actuating a notification switch from between two orthogonal directions.

7 Claims, 4 Drawing Sheets

MULTIDIRECTIONAL SWITCH ACTUATOR AND A PERSONAL DIGITAL ASSISTANT USING THE SAME

FIELD OF INVENTION

This invention relates to an actuator for actuation of a switch from at least two orthogonal directions. This invention also relates to a personal digital assistant that uses the actuator for actuating a notification switch.

BACKGROUND

Devices such as personal digital assistants (PDA) or palm-sized personal computers (P/PC) are fast becoming popular for keeping track of appointments and a list of to-do tasks ("to-dos") in our modern world. The applications on these devices support capturing of these appointments and tasks. These applications also provide a reminder feature for alerting a user of an upcoming appointment, event or task. The reminder feature usually causes a visual as well as an audio alert to be generated on the device. A light indicator that is strategically located on the device provides the visual alert. The visual and audio alerts can be generated periodically until a user has acknowledged the reminder. The user acknowledges the reminder by pressing a button on the device or by tapping on a touch-screen display. Such a method of acknowledging a reminder is sometimes cumbersome to a user, especially so when the device is stored away. It is therefore desirable to provide the user with a notification switch that is accessible from the outside of the device which the user can simply activate to acknowledge a reminder.

As these devices are usually small and easily stored in a shirt pocket, this notification switch should preferably be located on an accessible side of the device when the device is stored in the shirt pocket. This side of the device is usually a back wall of the device due to other design constraints. However, if located on such a back wall of the device, this notification switch will be hidden from view and difficult to access when the device is in use. A second notification switch can be introduced on the device but space being a major constraint on such a device does not always permit such an option.

From the foregoing, the prior art therefore has a need for an actuator of a notification switch that can be actuated from two orthogonal directions. This switch should preferably fit into a personal digital assistant without taking up too much valuable space.

SUMMARY

In accordance with a preferred embodiment, an actuator suitable for multi-directional actuation of a push button switch has an actuation button and a plunger. The actuation button has a surface for multi-directional activation. The plunger is attached to the actuation button to define a predetermined angle therebetween. The actuator also has a hinge means that is attached to either the actuation button or the plunger for pivotably mounting the actuator about a pivoting axis. Activation on any point on the surface of the actuation button results in a unidirectional moment about the pivoting axis to tilt the plunger to releasably actuate the push button switch.

In another aspect of the invention, the actuator described above is used in a device such as a personal digital assistant for actuating a notification switch. Preferably this actuator also serves to provide a visual alert.

BRIEF DESCRIPTION OF DRAWINGS

The invention will be better understood with reference to the following drawing, in which.

DETAILED DESCRIPTION OF THE PREFERRED EMBODIMENT

Hereafter, a preferred embodiment will be described in the context of a palm-sized personal computer (P/PC) that has an actuator according to the present invention for multidirectionally actuating a notification switch. However, it is to be understood that the invention is equally applicable to other types of devices such as electronic organizers, handheld personal computers, notebook computers, laptop computers and the like.

Figure 1B:
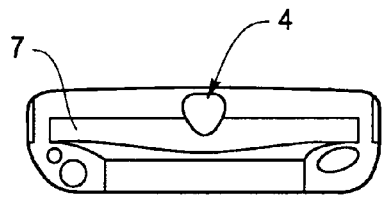
FIG. 1B is a side view of the P/PC of FIG. 1A showing a first portion of the actuator that is accessible from a first side of the P/PC.
Figure 1C:
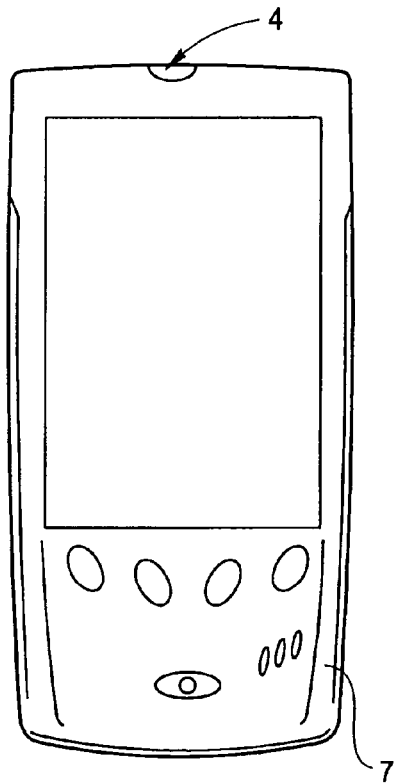
FIG. 1C is a plan view of the P/PC of FIG. 1A showing a second portion of the actuator in FIG. 1A. This second portion is accessible from a second side of the P/PC that is substantially orthogonal to the first side of the P/PC.
Figure 1A:
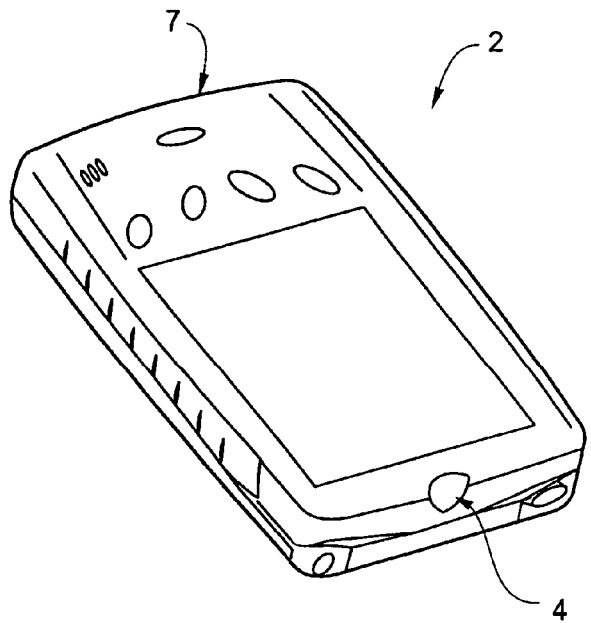
FIG. 1A is an isometric view of a palm-sized personal computer (P/PC) that has an actuator according to the present invention for multidirectionally actuating a switch.
Figure 2:
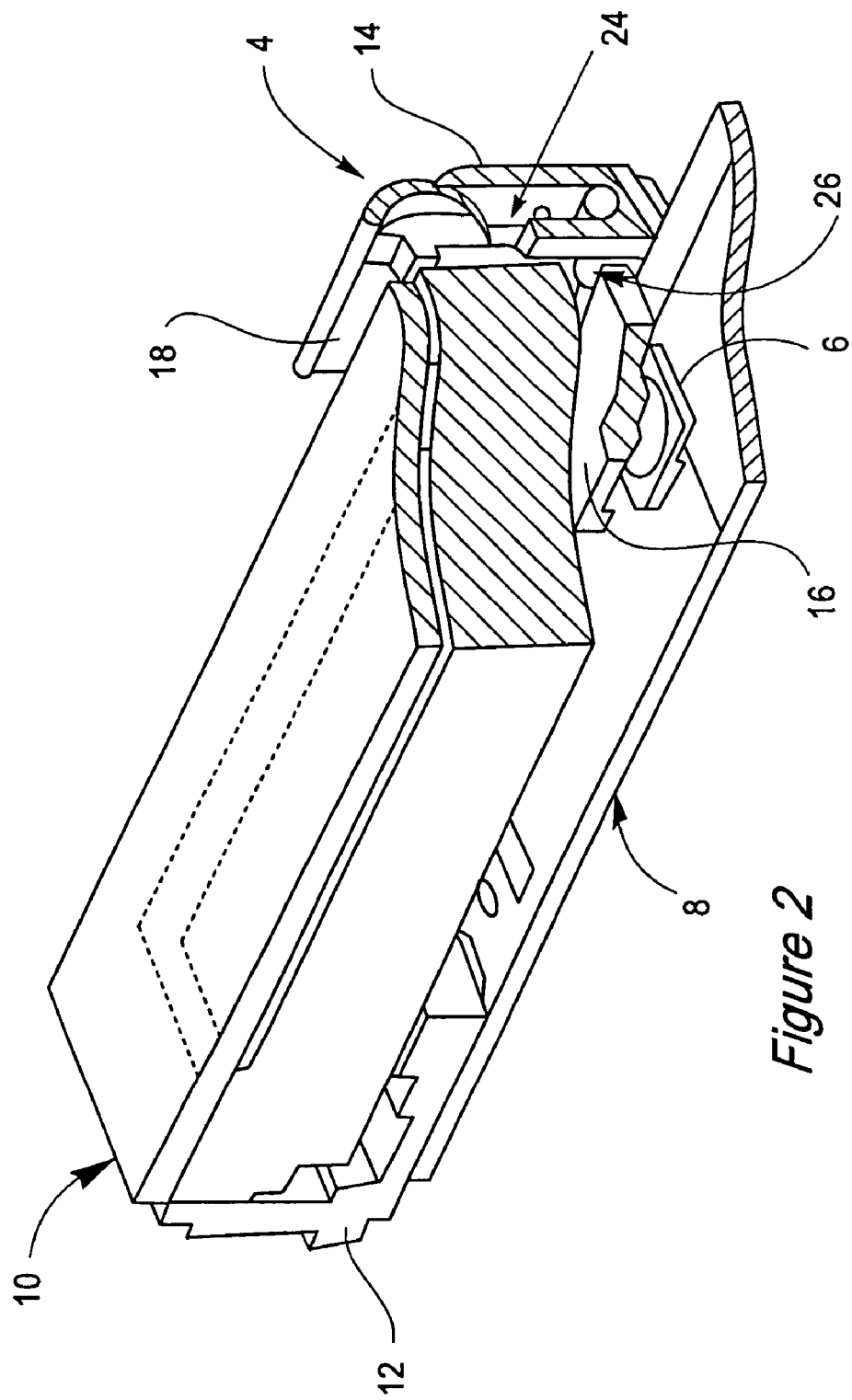
FIG. 2 is a sectional isometric view of a portion of the P/PC showing the assembly of the actuator and the switch on the P/PC.

FIG. 1A is an isometric view of a palm-sized personal computer 2 (P/PC) that has an actuator 4 for multi-directionally actuating a switch 6 (FIG. 2). FIG. 2 is a sectional isometric view of a portion of the P/PC showing the actuator 4 assembled on the P/PC 2 for accessibility from two substantially orthogonal surfaces. This P/PC 2 has a housing 7 that contains a printed circuit board assembly 8 (PCBA) and a touch-screen display module 10. The PCBA has electronics and appropriate software that allow it to function as a controller board for controlling the operations of the P/PC 2. The software includes an operating system (OS) such as the Windows CE OS and personal information management applications such as Tasks and Calendar available from Microsoft. The Tasks application allows a user to maintain a list of to-dos. The Tasks application captures information such as task descriptions, due dates and other information. The Calendar application allows a user to maintain a list of appointments, each of which logs information such as appointment description, date, time and venue. These applications provide the user with an option of setting a reminder for each task or appointment entered. The reminder can be in the form of an audio alert, a visual alert or both. In this preferred embodiment, a light emitting diode (LED) on the controller board emits light to provide the visual alert. The actuator 4 is preferably of a diffused translucent plastic such as polycarbonate. Such an actuator 4 functions as a light guide to illuminate the actuator 4 so that emitted light is viewable from outside of the housing 7. The reminder can be a one-time reminder or it can be periodically generated until acknowledged by a user. The user acknowledges a reminder by sending an appropriate signal to the controller board 8. This signal can be sent by actuating any switch on the P/PC, including the notification switch 6, or by touching the touch-screen display module 10.

When the P/PC 2 is placed in a shirt pocket or a side pocket of a bag, the actuator 4 remains accessible for a user to receive a visual alert and to respond to it. FIG. 1B shows a side view of the P/PC showing that the actuator 4 is accessible in this view. FIG. 1C is another view of the P/PC 2 orthogonal to the view in FIG. 1B wherein the actuator remains accessible. This view is what a user sees when using the P/PC 2. Although when using the P/PC 2, the user can respond to a reminder In many other ways, it is intuitive for the user to want to depress the actuator 4 for turning off an alert. This intuition is especially so when the user is accustomed to turning off the alert by actuating the actuator 4 when only the view of the P/PC 2 in FIG. 1B is seen.

The housing 7 of the P/PC 2 has a frame 12. The PCBA 8 is mounted to a bottom of this frame 12. On one end of the PCBA 8 is mounted the notification switch 6. The actuator 4 is pivotably mounted about a pivoting axis on a back wall 14 of the frame 12. The actuator 4 sits on the notification switch 6 and can be tilted to actuate the notification switch 6. This notification switch 6 is preferably a low profile dome switch. The display module 10 is mounted on the PCBA 8 to sandwich a plunger 16 of the actuator 4 therebetween. Such an assembly is space economical since the thickness of the plunger 16 need not be any more than the height of the electronic components on the PCBA 8.

Figure 3A:
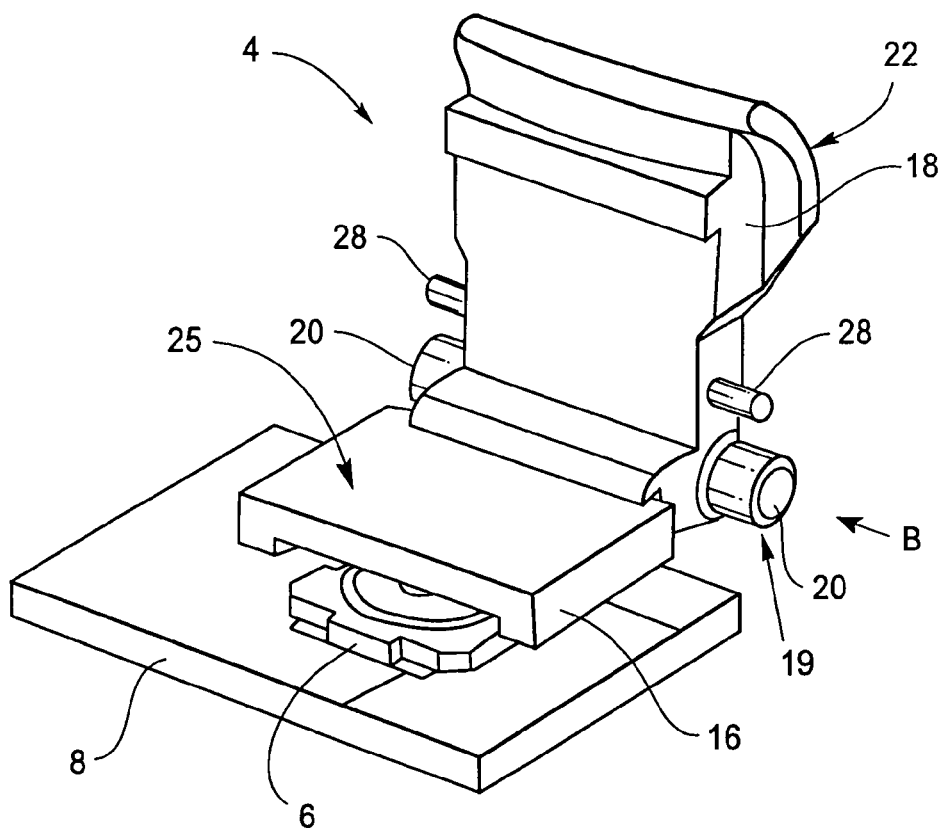
FIG. 3A is an isometric view of the actuator in FIG. 1A shown mounted for actuating the switch.
Figure 3B:
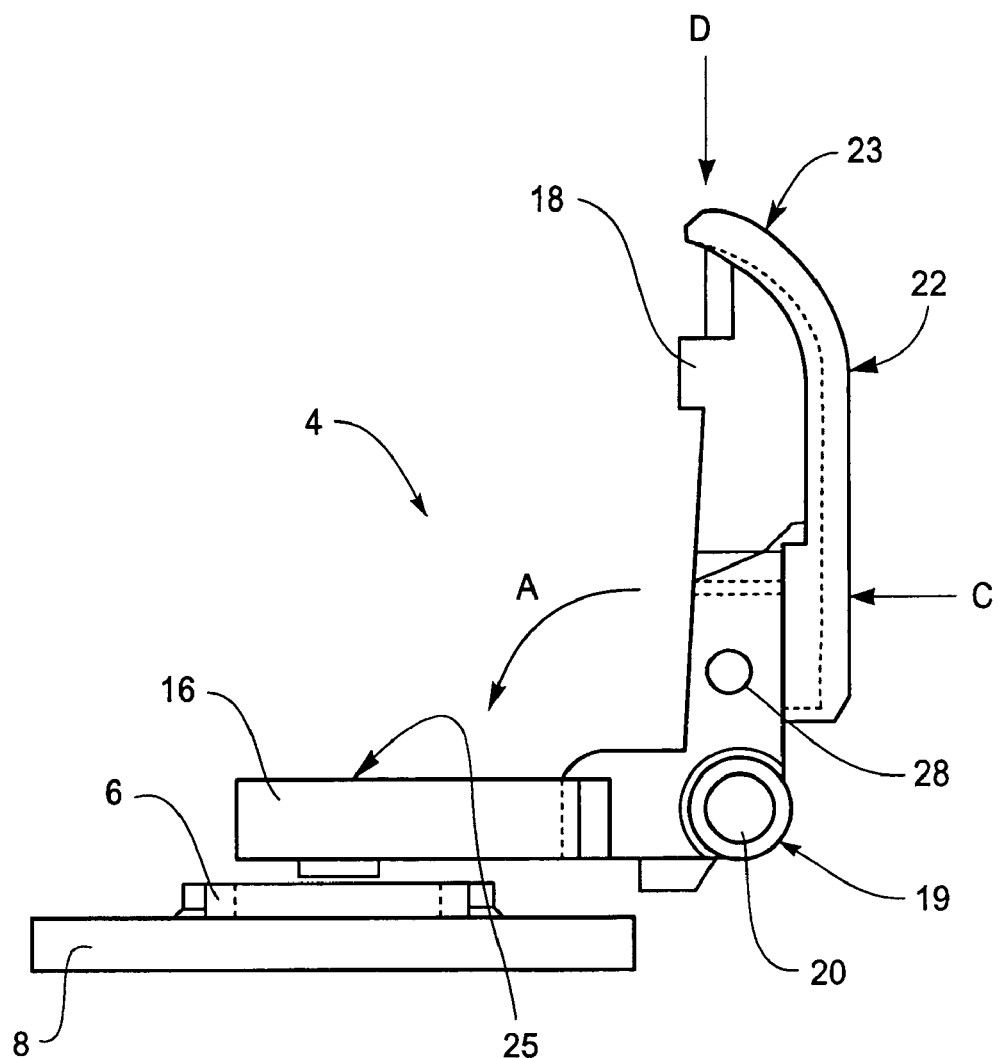
FIG. 3B is a side view of the actuator and the switch in FIG. 3A.

FIG. 3A is an isometric view of the actuator 4. FIG. 3B is a side view of the actuator 4 and the dome switch 6 as seen in the direction of an arrow B in FIG. 3A. The actuator 4 has an actuation button 18 that is attached to the plunger 16. In the preferred embodiment, the angle between the actuation button 18 and the plunger 16 is substantially orthogonal. Attached to an outer corner 19 of an intersection of the actuation button 18 and the plunger 16 is a pair of laterally extending hinge pins 20 that have a common pivoting axis. The actuation button 18 has an actuation surface 22 that has a curved surface 23 at a distal end from the hinge pins 20. A force applied to any portion of this surface 22 will result in a unidirectional moment, indicated by an arrow A in FIG. 3B, about the pivoting axis to tilt the plunger 16 against the dome switch 6 to actuate it. As a result, this actuator 4 allows actuation of the dome switch 6 from any direction between two substantially orthogonal directions indicated by arrows C and D in FIG. 3B. The direction of activation indicated by arrow C is substantially parallel to a plane 25 (FIG. 3A) of the plunger 16.

The assembly of the actuator 4 on the frame 12 of the P/PC 2 is next described with the aid of FIG. 2. On the back wall 14 of the frame 12 is a groove 24. This groove 24 has a U-shape cross-section. An opening 26 on one side of the groove 24 allows the plunger 16 to protrude into the confines of the frame 12. Another opening on an opposing side of the groove 24 exposes the surface 22 of the actuation button 18. The actuator 4 is inserted into this groove 24 to allow the hinge pins 20 to rest on the bottom of the groove 24 and to rock therein.

The actuator 4 preferably has at least one guide pin 28 that is attached to a side of the actuation button 18. This guide pin 28 prevents the actuator 4 from tilting over the pivoting axis during assembly of the P/PC 2 by restricting the actuation button 18 to rock only within the groove 24. The diameter of the guide pin 28 is smaller than the diameter of the hinge pins 20 to allow the actuator to be tilted sufficiently within the groove 24 to actuate the dome switch 6.

I claim:

1. An actuator suitable for multi-directional actuation of a push button switch, the actuator comprising:

an actuation button having a curved surface for multi-directional activation;

a plunger fixedly attached to the actuation button to define a predetermined angle therebetween; and two lateral hinge pins for pivotably mounting the actuator to a housing so that the actuator is pivotable about a pivoting axis that extends through the hinge pins;

whereby actuation on any point on the surface of the actuation button results in a unidirectional moment about the pivoting axis to tilt the plunger to releasably actuate the push button switch.

2. An actuator according to claim 1, wherein the curved surface is distal from the hinge pins and is configured to allow actuation from any direction between a first direction that is substantially parallel to the plunger and a second direction that is substantially orthogonal to the first direction.

3. An actuator according to claim 1, wherein the predetermined angle between the actuation button and the plunger is substantially a right angle.

4. A personal digital assistant (PDA) that is suitable for keeping appointments and tasks and that is able to remind a user of an upcoming appointment and task by generating a reminder alert, the personal digital assistant comprising:

a controller board for controlling functions of the PDA, said controller board comprising software operable to keep appointments and other tasks assigned by the user;

a touch-screen display mounted above the controller board and electrically coupled to and controlled by the controller board;

a housing for containing the controller board and the display, the display being viewable on a surface of the housing and the housing having a wall adjacent the surface of the housing;

a push button switch mounted on a side of the controller board adjacent the display for activation to acknowledge that a reminder alert is received; and an actuator pivotably mounted on the wall of the housing along a pivoting axis, the actuator comprising:

an actuation button having a curved surface that allows multi-directional activation from outside of the housing; and a plunger member fixedly attached to the actuation button and oriented substantially orthogonal to the actuation button; and two lateral hinge pins extending along the pivoting axis for pivotably mounting the actuator to the wall;

whereby actuation on any point on the surface of the actuation button results in a unidirectional moment about the pivoting axis to tilt the plunger to releasably actuate the push button switch.

5. A personal digital assistant (PDA) according to claim 4, further comprising light indicator means, electrically coupled to the controller board, which is activated during a reminder and wherein the actuator further functions as a light guide to provide a visual alert.

6. A personal digital assistant according to claim 4, further comprising at least one guide pin which laterally extends from the actuation button for restricting the tilting movement of the actuator.

7. A personal digital assistant according to claim 4, wherein the push button switch is a dome switch.

* * * * *